US010113482B2

(12) United States Patent
Poulin

(10) Patent No.: US 10,113,482 B2
(45) Date of Patent: Oct. 30, 2018

(54) GEARBOX FOR GAS TURBINE ENGINE

(71) Applicant: PRATT & WHITNEY CANADA CORP., Longueuil (CA)

(72) Inventor: Martin Poulin, Mont Saint-Hilaire (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 147 days.

(21) Appl. No.: 15/351,611

(22) Filed: Nov. 15, 2016

(65) Prior Publication Data

US 2018/0135512 A1    May 17, 2018

(51) Int. Cl.
| F16H 37/06 | (2006.01) |
| F02C 3/113 | (2006.01) |
| F02C 7/36 | (2006.01) |
| F16H 3/66 | (2006.01) |
| F02K 3/06 | (2006.01) |
| F02C 6/20 | (2006.01) |
| F16H 3/54 | (2006.01) |
| F16H 3/58 | (2006.01) |

(52) U.S. Cl.
CPC .............. *F02C 3/113* (2013.01); *F02C 6/206* (2013.01); *F02C 7/36* (2013.01); *F02K 3/06* (2013.01); *F16H 3/54* (2013.01); *F16H 3/58* (2013.01); *F16H 3/66* (2013.01); *F16H 3/666* (2013.01); *F05D 2260/40311* (2013.01); *F16H 2200/0034* (2013.01); *F16H 2200/2005* (2013.01); *F16H 2200/2035* (2013.01)

(58) Field of Classification Search
CPC .. F02C 3/113; F02C 7/36; F05D 2260/40311; F16H 3/66; F16H 3/666; F16H 2200/0034; F16H 2200/2005; F16H 2200/2035
See application file for complete search history.

(56) References Cited

U.S. PATENT DOCUMENTS

| 4,862,009 | A | 8/1989 | King | |
| 7,698,884 | B2 * | 4/2010 | Maguire | ................ F02C 3/107 60/39.163 |
| 8,876,650 | B2 | 11/2014 | Lemmers, Jr. | |
| 2004/0138021 | A1 | 7/2004 | Stettler | |
| 2014/0208760 | A1 | 7/2014 | Dubreuil | |
| 2015/0176486 | A1 | 6/2015 | Menheere | |

FOREIGN PATENT DOCUMENTS

WO    WO2015/006153    1/2015

OTHER PUBLICATIONS

European Search Report dated Apr. 11, 2018 in corresponding EP application No. 17194136.2 (3 pages).

* cited by examiner

*Primary Examiner* — Mark J Beauchaine
(74) *Attorney, Agent, or Firm* — Norton Rose Fulbright Canada LLP

(57) ABSTRACT

A gearbox for an aircraft engine including first and second gears in driving engagement through planet gears supported by a carrier. Selective application of a brake and a blocking member permit operation in a speed change configuration and a direct drive configuration.

20 Claims, 13 Drawing Sheets

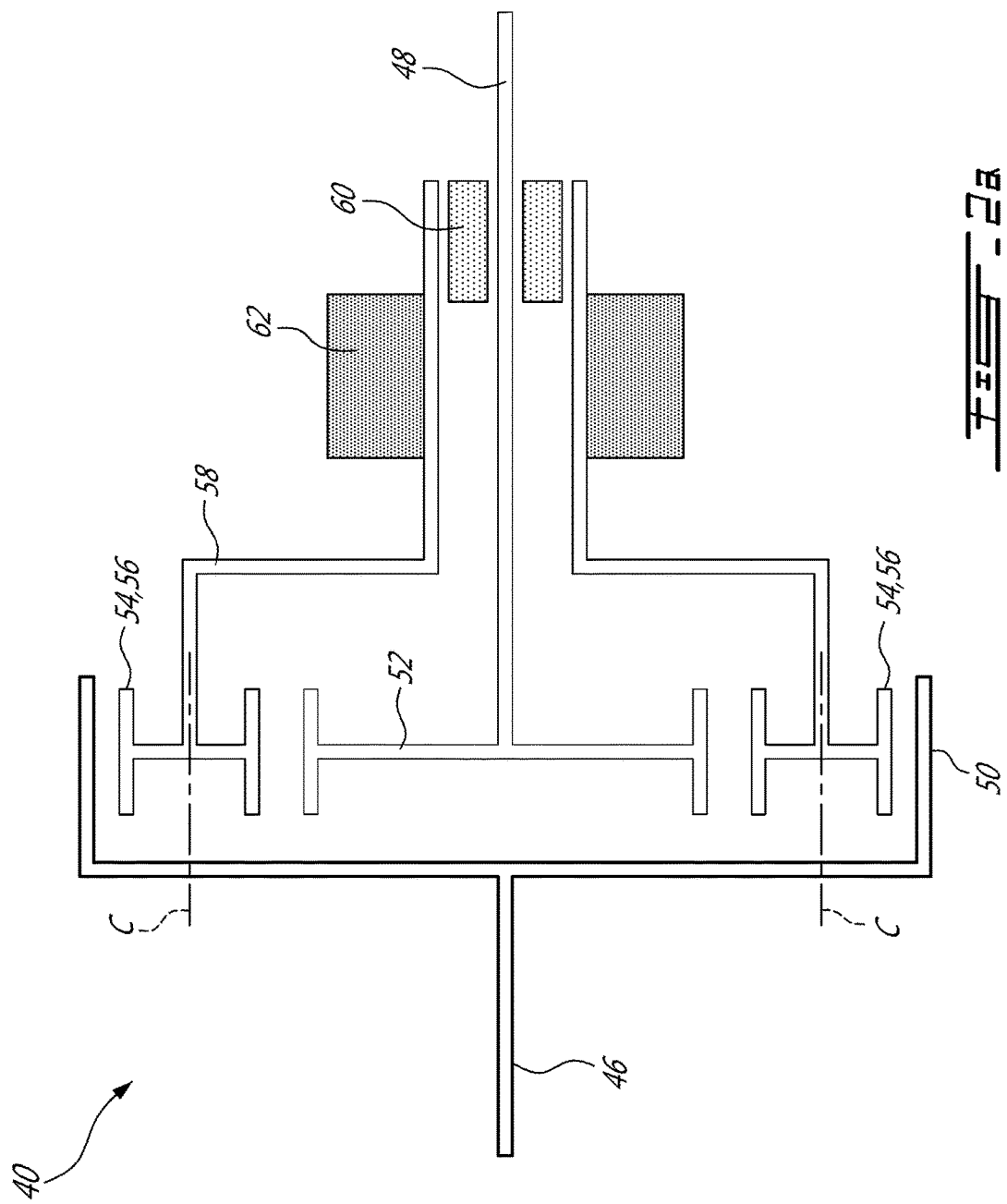

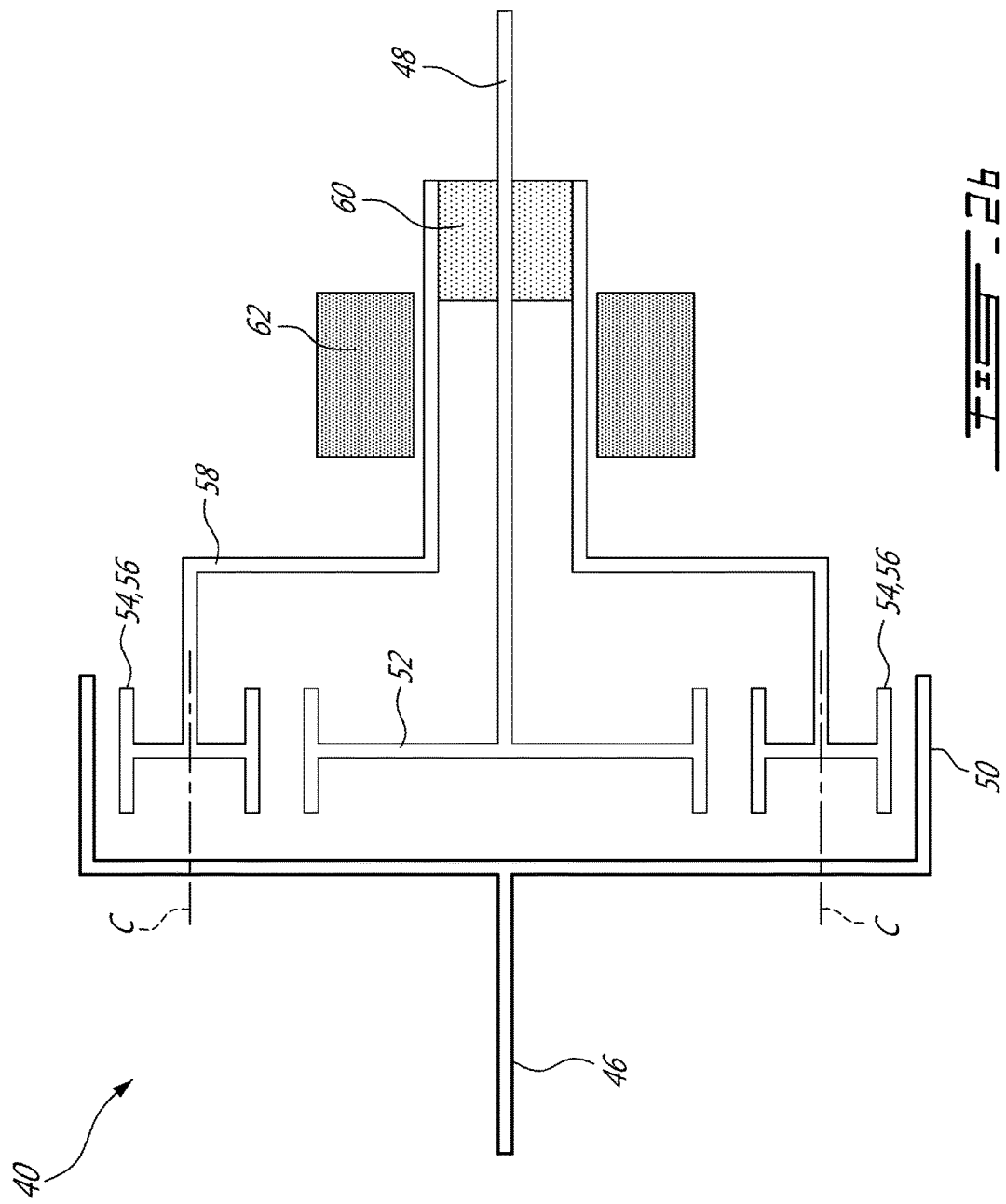

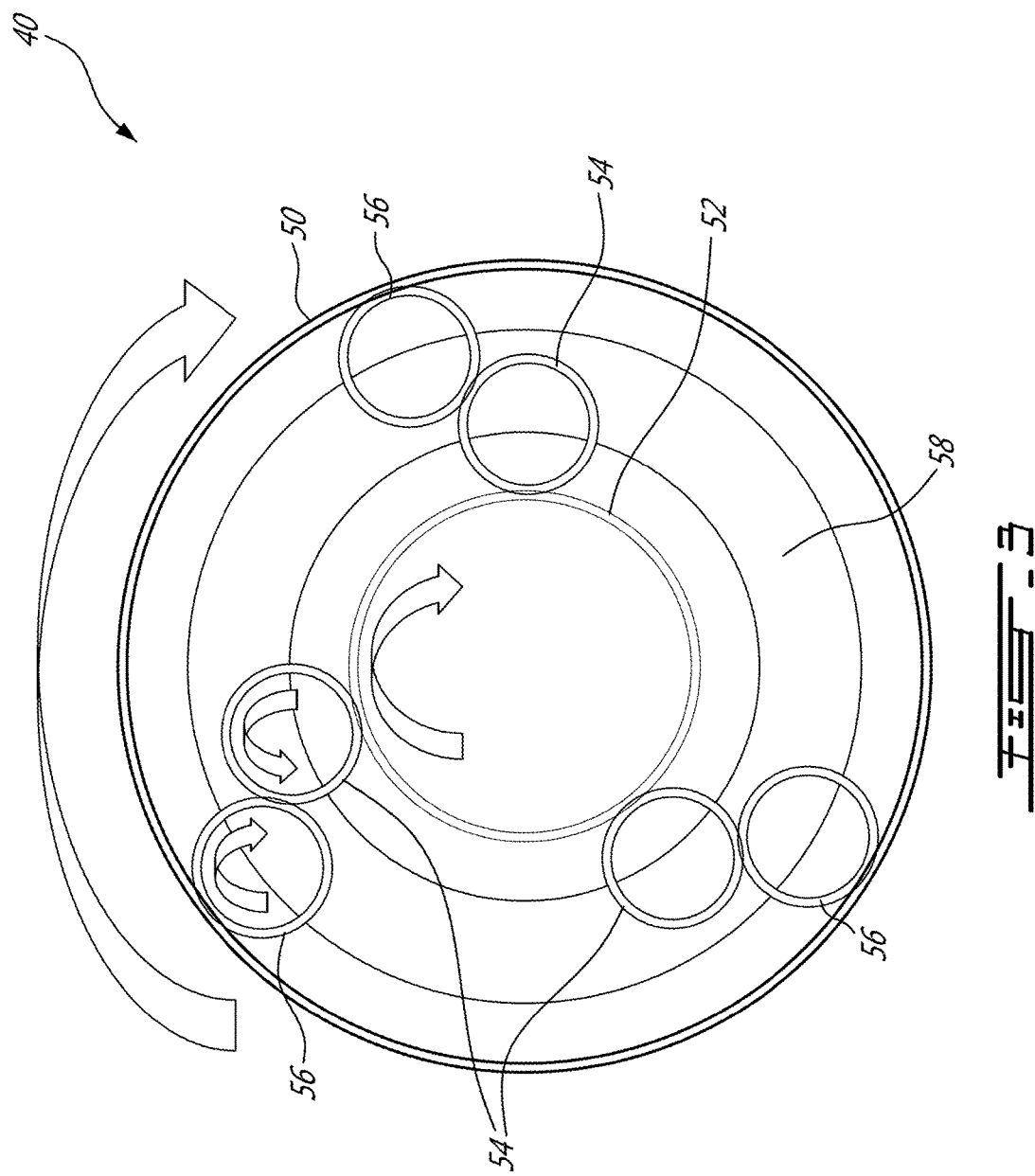

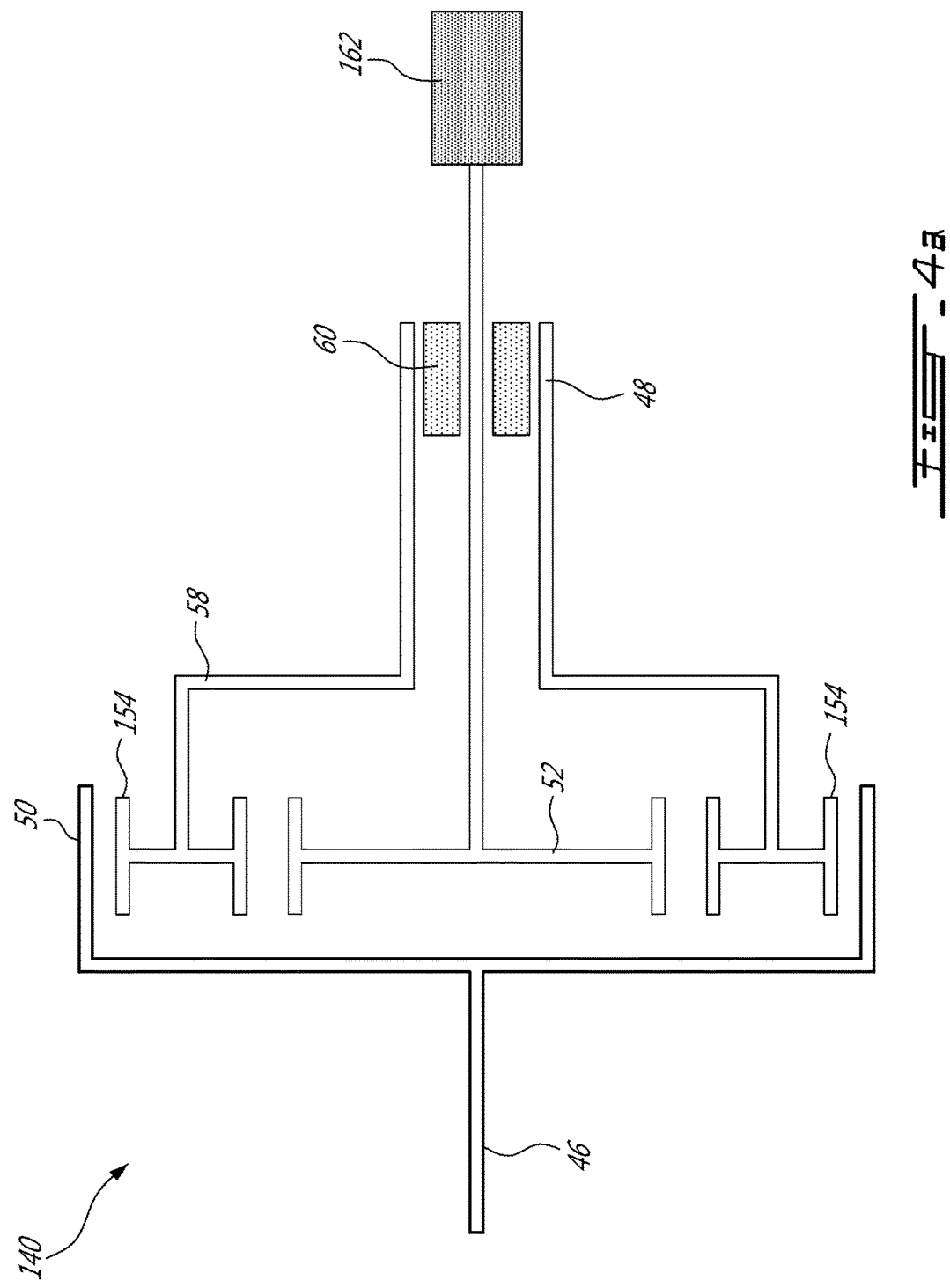

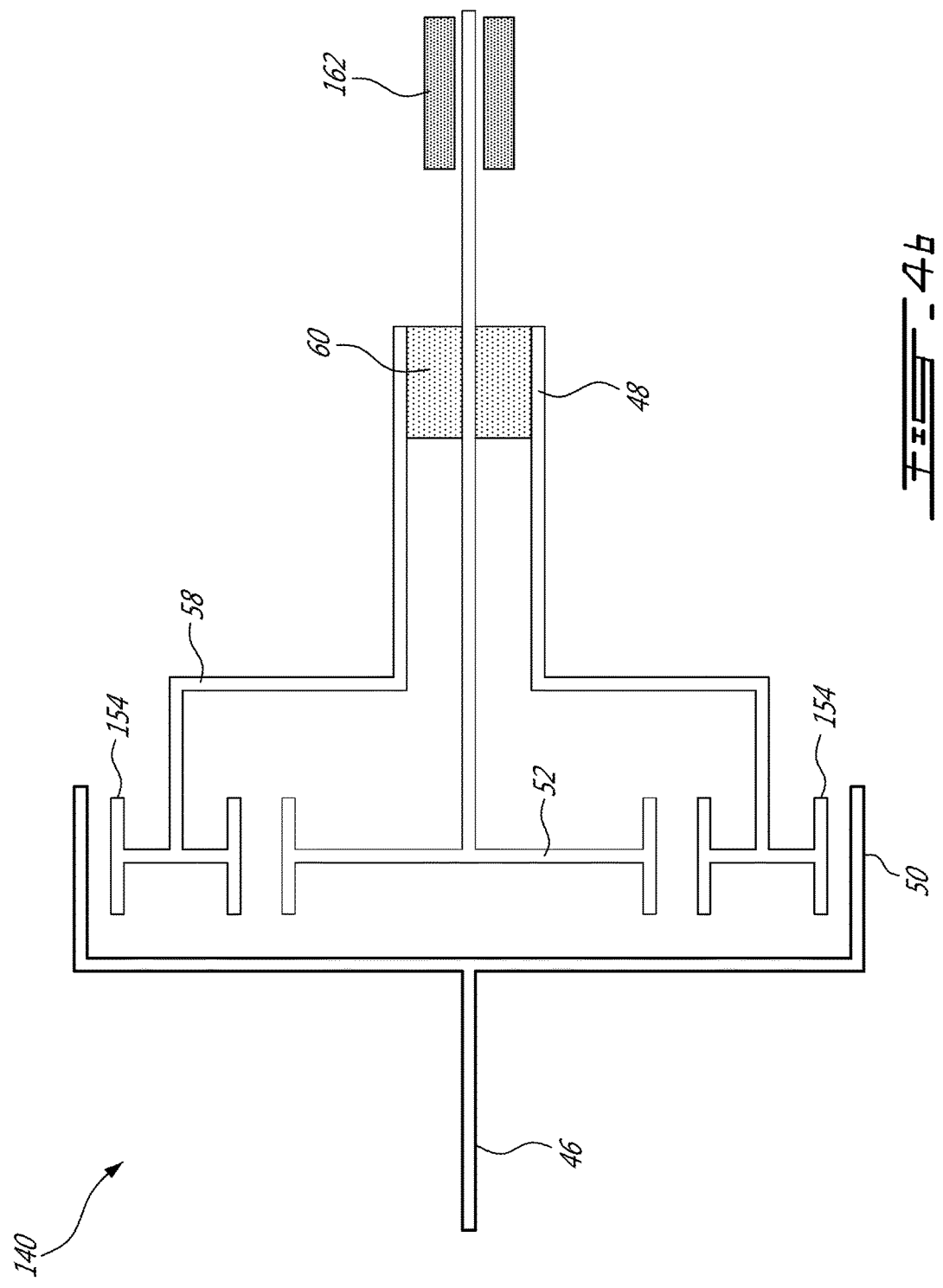

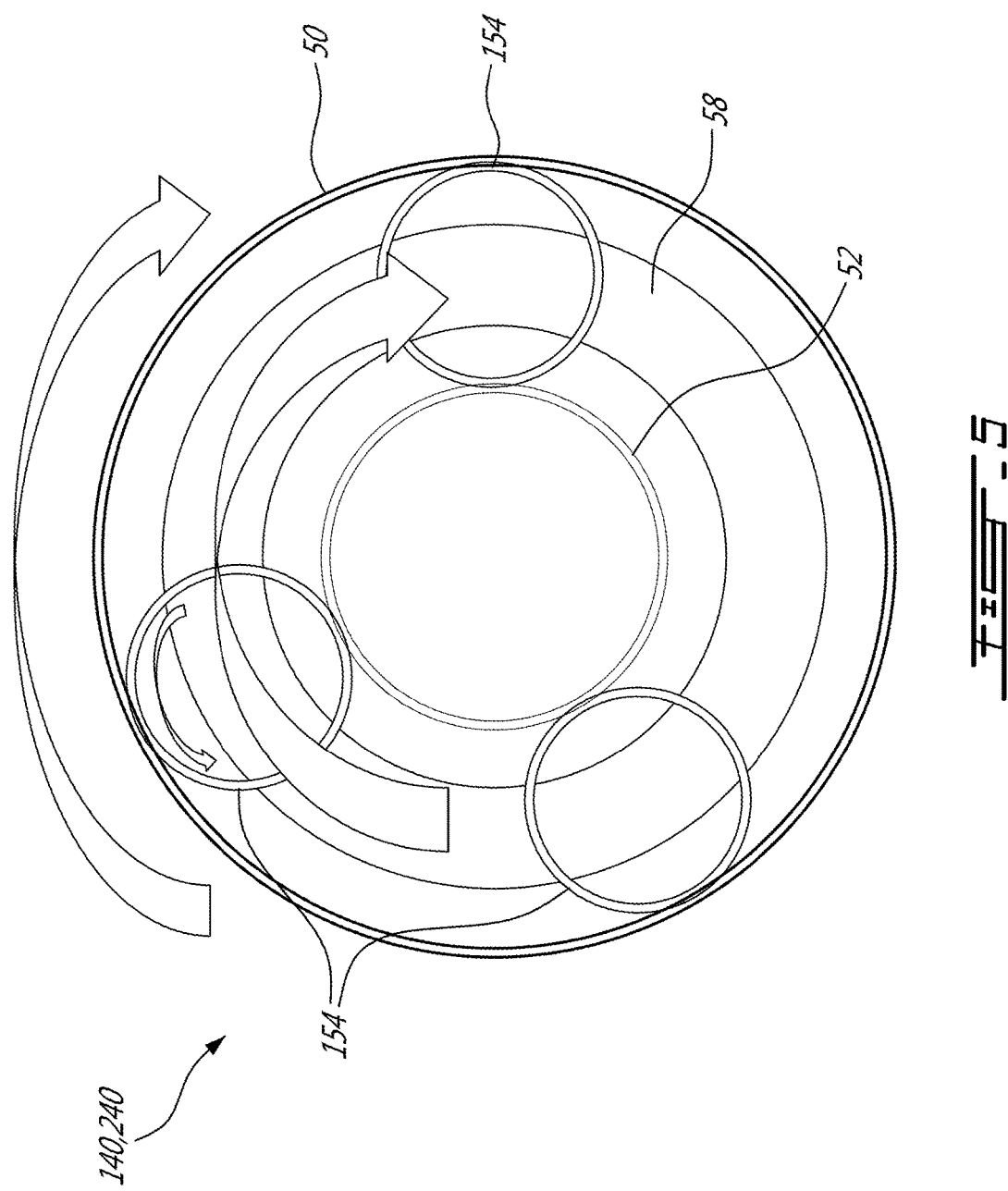

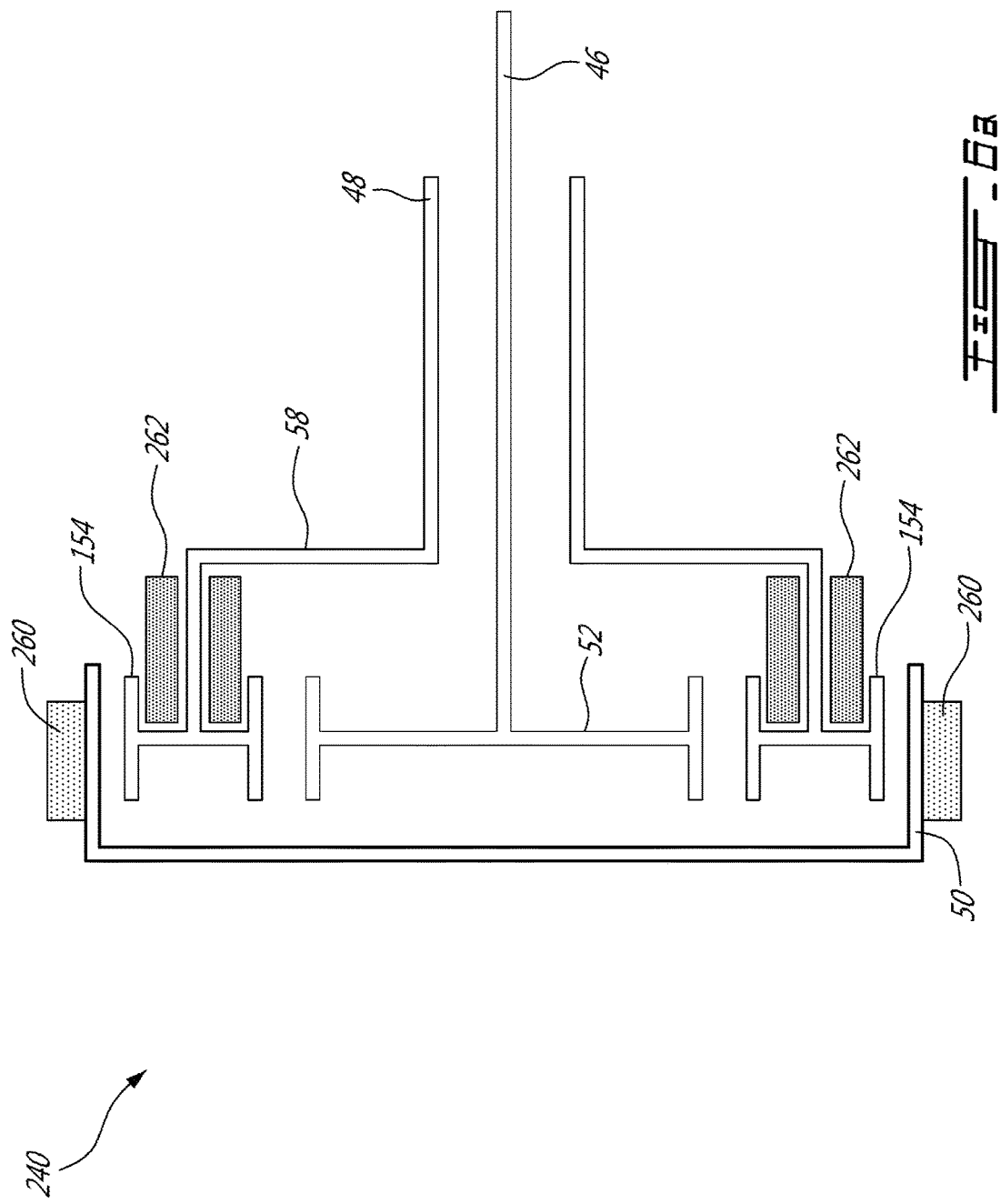

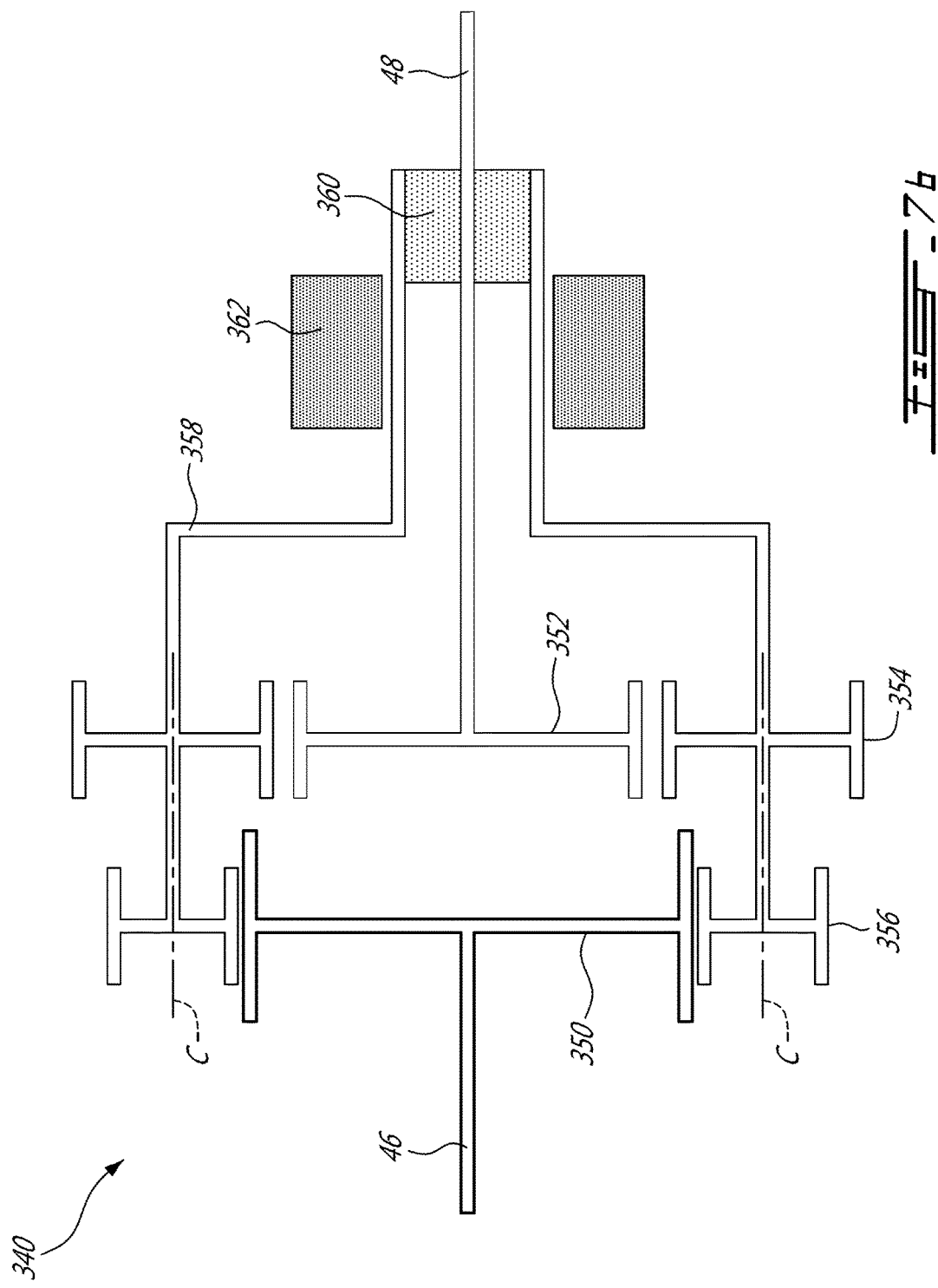

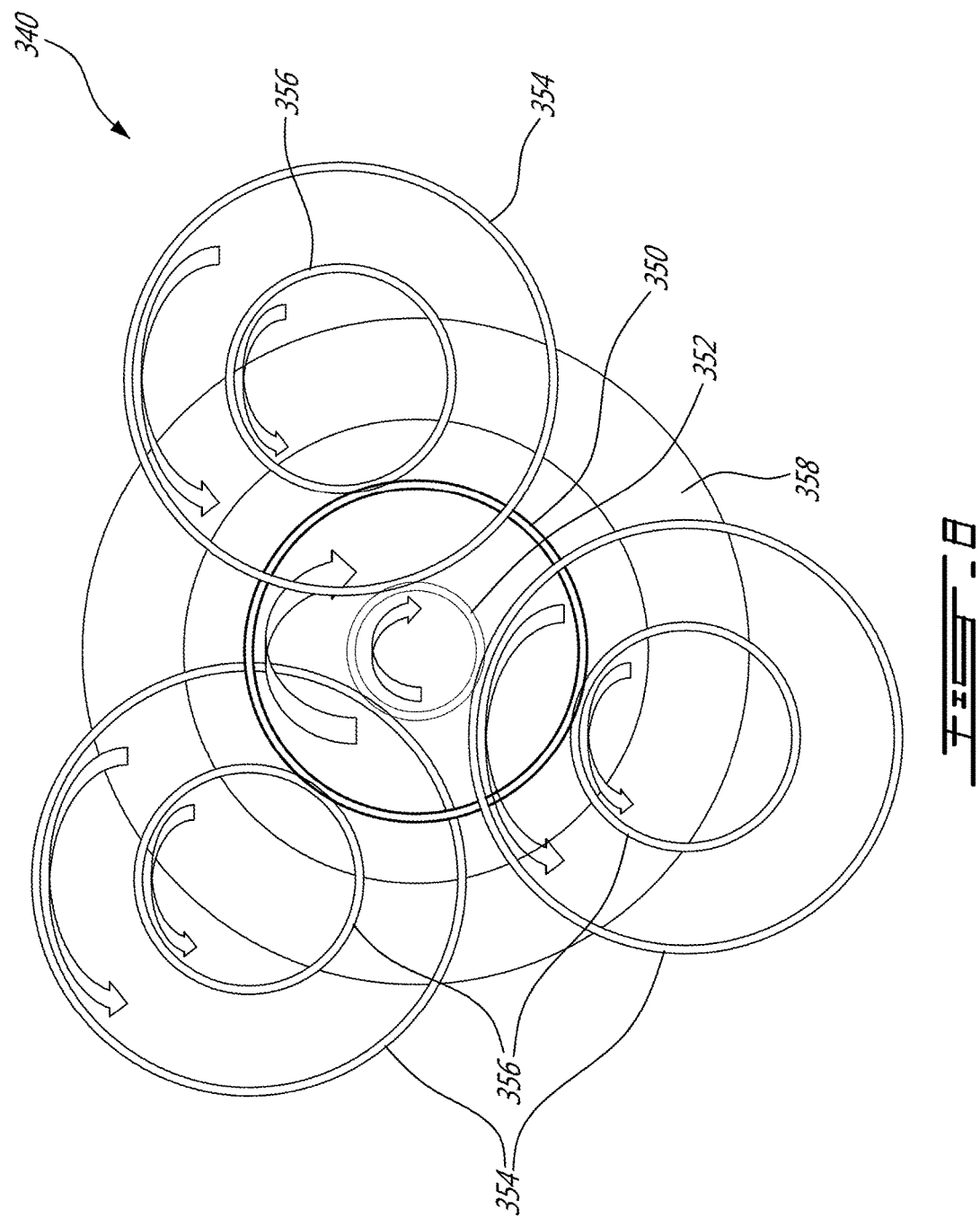

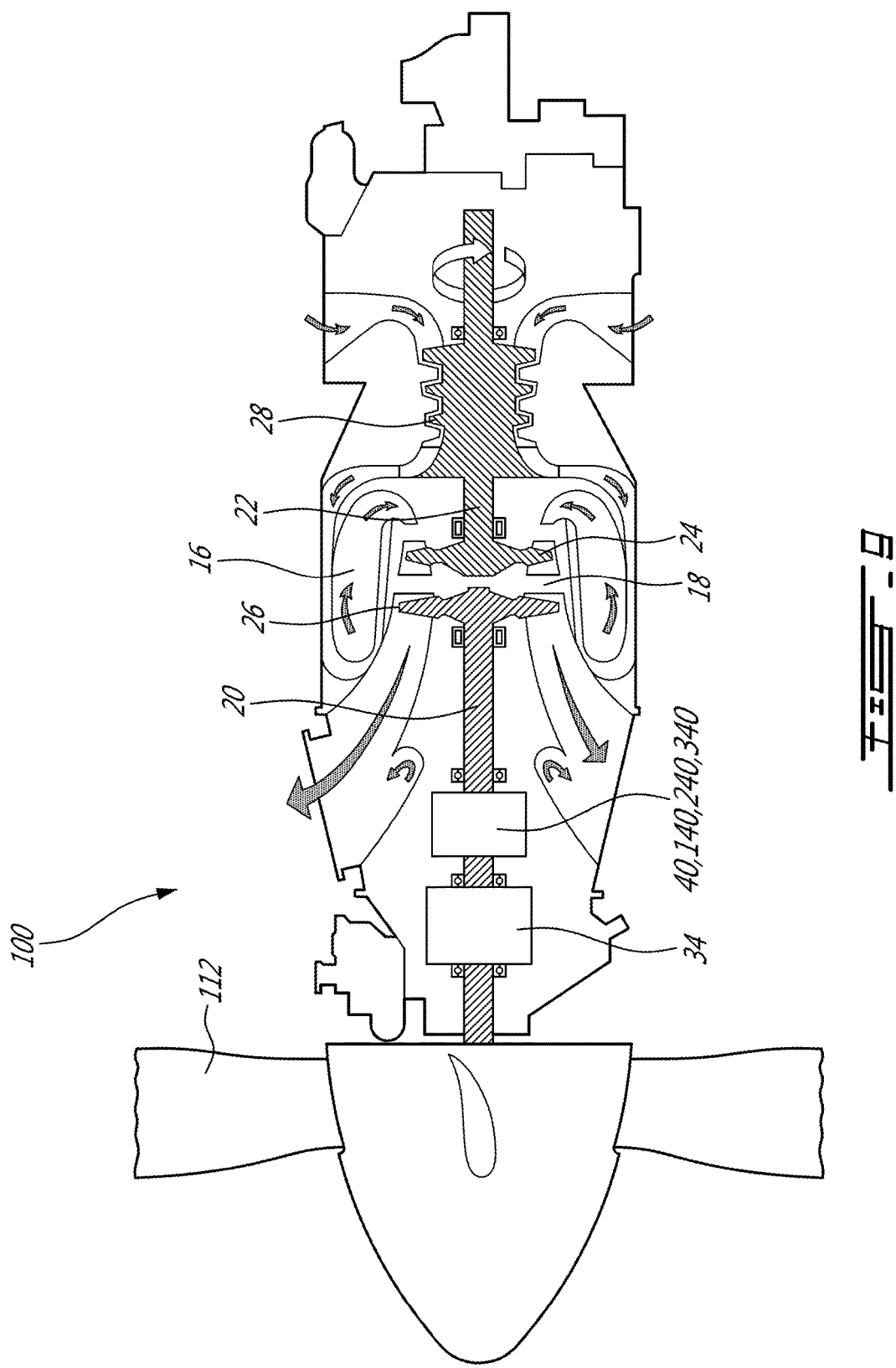

GEARBOX FOR GAS TURBINE ENGINE

TECHNICAL FIELD

The application relates generally to the transmission of power in aircraft engines and, more particularly, to gearboxes through which an aircraft engine shaft can drive a load.

BACKGROUND OF THE ART

In gas turbine engines, it is known to drive a propeller or a fan rotor through a gearbox defining a single ratio between the input and output rotational speeds of the gearbox; this ratio typically defines a speed reduction from the input speed to the output speed. This ratio may be selected based on predetermined flight conditions, but however may not be optimal for other flight conditions.

SUMMARY

In one aspect, there is provided a gearbox for a gas turbine engine, the gearbox comprising: a gear assembly including first and second gears in driving engagement through planet gears, the planet gears rotatable about a respective central axis and supported by a carrier, the assembly connected to input and output shafts and including at least one rotatable intermediate component; a brake configured to selectively impede rotation of the intermediate component; and a blocking member configured to selectively impede rotation of the planet gears about the central axes; wherein the gearbox is selectively configurable between: a speed change configuration wherein the brake is configured to impede the rotation of the intermediate component and the blocking member is configured to allow the rotation of the planet gears about the central axes to define a speed ratio different than 1 between rotational speeds of the input and output shafts; and a direct drive configuration wherein the brake is configured to allow the rotation of the intermediate component and the blocking member is configured to impede the rotation of the planet gears about the central axes so that the input and output shafts are rotatable together at a same rotational speed.

In another aspect, there is provided a gas turbine engine comprising: an input shaft drivingly engaged to a turbine rotor; an output shaft drivingly engaged to a drivable rotor; and a gearbox including first and second gears in driving engagement through planet gears, the planet gears rotatable about a respective central axis and supported by a carrier, wherein: one of the first gear, second gear and carrier is connected to the input shaft, another one of the first gear, second gear and carrier is connected to the output shaft, and a remaining one of the first gear, second gear and carrier is an intermediate component, the gearbox further including a brake and a blocking member, the brake selectively movable between a brake position impeding rotation of the intermediate component and a release position allowing rotation of the intermediate component, the blocking member selectively movable between an engaged position impeding rotation of the planet gears about the central axes and a disengaged position allowing rotation of the planet gears about the central axes; wherein the gearbox is selectively configurable between: a direct drive configuration where the brake is in the release position and the blocking member is in the engaged position, and a speed change configuration where the brake is in the brake position and the blocking member is in the disengaged position.

In a further aspect, there is provided a method of rotating a rotor of a gas turbine engine through a gearbox including first and second gears drivingly interconnected by rotatable planet gears supported by a carrier, the method comprising: rotating an input shaft with a turbine section of the gas turbine engine; rotating one of the first gear, the second gear and the carrier with the input shaft while another one of the first gear, the second gear and the carrier is connected to an output shaft and a remaining one of the first gear, the second gear and the carrier is an intermediate component; configuring the gearbox in a selected one of a direct drive configuration and a speed change configuration, including: when the direct drive configuration is selected, preventing rotation of the planet gears while allowing rotation of the intermediate component so that the input and output shafts rotate together as a single shaft at a same rotational speed, and when the second configuration is selected, preventing rotation of the intermediate component while allowing rotation of the planet gears so that the input and output shafts rotate at different rotational speeds; and driving the output shaft with the input shaft through the gearbox, and rotating the rotor with the output shaft.

DESCRIPTION OF THE DRAWINGS

Reference is now made to the accompanying figures in which:

FIG. 2a is a schematic side view of a gearbox in accordance with a particular embodiment which can be used in a gas turbine engine such as shown in FIG. 1, the gearbox being shown in a speed change configuration;

FIG. 2b is a schematic side view of the gearbox of FIG. 2a in a direct drive configuration;

FIG. 3 is a schematic front view of the gearbox of FIGS. 2a-2b;

FIG. 4a is a schematic side view of a gearbox in accordance with another particular embodiment which can be used in a gas turbine engine such as shown in FIG. 1, the gearbox being shown in a speed change configuration;

FIG. 4b is a schematic side view of the gearbox of FIG. 4a in a direct drive configuration;

FIG. 5 is a schematic front view of the gearbox of FIGS. 4a-4b;

FIG. 6a is a schematic side view of a gearbox in accordance with yet another particular embodiment which can be used in a gas turbine engine such as shown in FIG. 1, the gearbox being shown in a speed change configuration;

FIG. 7b is a schematic side view of the gearbox of FIG. 7a in a direct drive configuration;

FIG. 8 is a schematic front view of the gearbox of FIGS. 7a-7b; and

FIG. 9 is a schematic cross-sectional view of another gas turbine engine in which the gearboxes of FIGS. 2-8 can be used.

DETAILED DESCRIPTION

Figure 1:
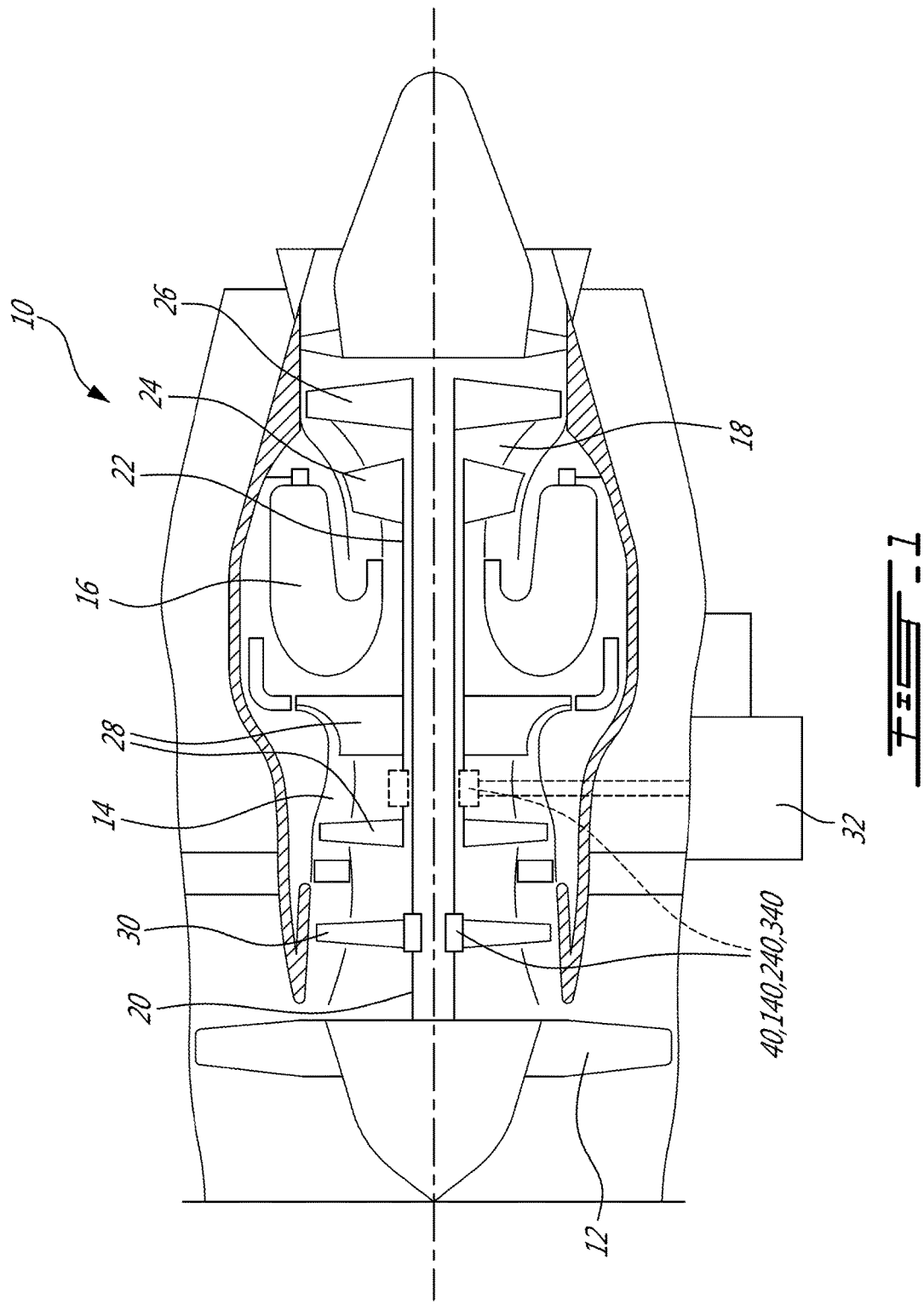
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine includes low pressure and high pressure shafts 20, 22 which are rotatable independently from one another. The two shafts 20, 22 are coaxial and the low pressure shaft 20 extends within the high pressure shaft 22. The high pressure shaft 22 is connected to rotor(s) 24 of a high pressure portion of the turbine section 18, so as to be driven by the high pressure turbine rotor(s) 24. The low pressure shaft 20 is connected to rotor(s) 26 of a low pressure portion of the turbine section 18, so as to be driven by the low pressure turbine rotor(s) 26 located downstream of the high pressure turbine rotor(s) 24.

The high pressure shaft 22 is drivingly engaged to one or more rotor(s) 28 of a high pressure portion of the compressor section 14; in the embodiment shown in solid lines, the high pressure compressor rotors 28 are directly connected to the high pressure shaft 22 so as to rotate at the same rotational speed. The low pressure shaft 20 is drivingly engaged to the fan 12, and to one or more rotor(s) 30 of a low pressure portion of the compressor section 14, e.g. boost compressor rotor(s), located upstream of the high pressure compressor rotor(s) 28 and downstream of the fan 12.

The gas turbine engine includes a gearbox 40, 140, 240, 340 through which one of the shafts 20, 22 of the gas turbine engine 10 is drivingly engaged to a rotatable load, such as a drivable rotor. As will be further described below, the gearbox 40, 140, 240, 340 has two configurations allowing the shaft to drive the rotatable load either through a direct drive (i.e., speed ratio of 1) or through a drive having a speed ratio different from 1, i.e. providing a speed increase or speed decrease.

In the embodiment shown in solid lines, the gearbox 40, 140, 240, 340 provides the driving engagement between the low pressure shaft 20 and the low pressure or boost compressor rotor 30. It is understood that the gearbox 40, 140, 240, 340 may additionally or alternately provide the driving engagement between the low pressure shaft 20 and any other suitable drivable rotor or rotatable element of the gas turbine engine, including, but not limited to, the fan 12. The gearbox 40, 140, 240, 340 may alternately provide the driving engagement between the high pressure shaft 22 and any suitable drivable rotor or rotatable element, including, but not limited to, one or more high pressure compressor rotor(s) 28 (as shown in dotted lines), and accessories 32. The engine may include more than two rotatable shafts, and the gearbox 40, 140, 240, 340 may be used for example to provide the driving engagement between an intermediate shaft and a drivable rotor or other rotatable element of the gas turbine engine 10.

In a particular embodiment where the gearbox 40, 140, 240, 340 is used to drive a boost compressor rotor 30 from the low pressure shaft 20, the gearbox 40, 140, 240, 340 provides access to increased power for the gas turbine engine 10 by increasing the rotational speed of the boost compressor rotor 30 in certain conditions, e.g., one engine operation, hot temperature, high altitude operation. The gearbox 40, 140, 240, 340 can be switched from a direct drive to a speed increase configuration to provide for an increased rotational speed of the boost compressor rotor 30.

Although the gas turbine engine 10 has been shown as a turbofan engine, it is understood that the gas turbine engine 10 may have any other suitable configuration, including, but not limited to, a turboprop and a turboshaft configuration. The gearbox 40, 140, 240, 340 may be used in such engines similarly as shown in FIG. 1. For a turboprop engine where the gearbox 40, 140, 240, 340 is used to drive a boost compressor rotor 30, switching from a direct drive to a speed increase configuration allows for a propeller speed reduction in certain flight regimes (i.e. rotational speed reduction of the low pressure shaft and accordingly of the input shaft) while maintaining the rotational speed or minimizing the speed reduction of the boost compressor rotor 30.

Moreover, for a turboprop engine 100 and as shown in FIG. 9, the gearbox 40, 140, 240, 340 may be used in the driving engagement between the low pressure/power shaft 20 and the propeller 112, for example in series with a reduction gearbox 34. In such an embodiment, the gearbox 40, 140, 240, 340 can be used to change the propeller speed in certain flight regimes without changing the rotational speed of the driving power turbine rotor(s) 26, for example for noise reduction purposes.

Referring now to FIGS. 2a, 2b and 3, a particular embodiment of the gearbox 40 is generally shown, which drivingly engages input and output shafts 46, 48. The input shaft 46 is connected to the driving shaft of the gas turbine engine 10, for example the low pressure shaft 20 (FIG. 1). The input shaft 46 may be connected to the driving shaft in any suitable manner, including removable connections (e.g. spline connection, bolted connection) and permanent connections (e.g. integrally formed therewith).

The output shaft 48 is connected to the drivable rotor or other rotatable load, for example the low pressure or boost compressor rotor 30 (FIG. 1). The output shaft 48 may be connected to the drivable rotor or other rotatable load in any suitable manner, including removable connections (e.g. spline connection, bolted connection) and permanent connections (e.g. integrally formed therewith).

The gearbox 40 is a planetary gear set, and has a gear assembly including a ring gear 50 and a sun gear 52 in driving engagement with each other through planet gears 54, 56 supported by a rotatable carrier 58. In the particular embodiment shown, the ring gear 50 is the input component and is connected to the input shaft 46, the sun gear 52 is the output component and is connected to the output shaft 48, and the carrier 58 is an intermediate component. Other configurations are possible, as will be further detailed below.

The particular embodiment of the gearbox 40 shown is selectively configurable between a speed change configuration where the output shaft 48 rotates faster than the input shaft 46, and a direct drive configuration where the input and output shafts 46, 48 rotate together as a single shaft.

As can be best seen in FIG. 3, in order for the input and output shafts 46, 48 (ring and sun gear 50, 52) to have the same direction of rotation, the planet gears include a first set of planet gears 54 in meshed engagement with the sun gear 52 and a second set of planet gears 56 in meshed engagement with the ring gear 50, with corresponding planet gears 54, 56 of the first and second sets being meshed together. Although each set of planet gears 54, 56 is shown as including three planet gears, it is understood that alternately more or less planet gears may be provided.

Referring back to FIGS. 2a-2b, the gearbox 40 further includes a blocking member 60 which in an engaged position (FIG. 2b) impedes (i.e. prevents) the rotation of the planet gears 54, 56 about their respective central axis C. In the embodiment shown, the blocking member 60 is a clutch which in the engaged position connects the carrier 58 (i.e., the intermediate component) to the output shaft 48 so that they are rotatable together at the same rotational speed. In the embodiment shown, the clutch 60 connects the carrier 58 and output shaft 48 by engaging a shaft of the carrier 58 and the output shaft 48. Alternately, the clutch 60 can connect the carrier 58 and output shaft 48 by engaging or any other element connected to the carrier 58 and rotatable therewith at the same rotational speed and/or any other element connected to the output shaft 48 and rotatable therewith at the same rotational speed (including, but not limited to, the sun gear 52). By forcing the carrier 58 and output shaft 48 to rotate at the same rotational speed, the clutch 60 prevents the planet gears 54, 56 from rotating about their axes C. The clutch 60 also has a disengaged position (FIG. 2a) where it is disengaged from one or both of the carrier 58 and the output shaft 48, so they can rotate relative to each other.

The gearbox also includes a brake 62 which in a brake position (FIG. 2a) is engaged the shaft of the carrier 58 (i.e., the intermediate component) to impede (i.e. prevent) its rotation. The brake 62 also has a release position (FIG. 2b) where it is disengaged from the carrier 58 to allow its rotation.

Is it understood that in the present specification, including claims, the term "clutch" is intended to include any mechanism for selectively engaging two rotatable components to each other so that they become rotatable together as a single component at a same rotational speed, while the term "brake" is intended to include any mechanism for selectively engaging a rotatable component to impede its rotation. Both terms are intended to include mechanisms that can be engaged automatically and mechanism that require actuation to be engaged. For example, the clutch 60 and brake 62 can be similar or identical mechanisms, differing in what they are interconnecting: two rotatable components for the clutch 60, and a rotatable component to a fixed structure for the brake 62.

As shown in FIG. 2a, in the speed change configuration, the clutch 60 is in its disengaged position, to allow the output shaft 48 and the carrier 58 to rotate with respect to each other. The brake 62 is in its brake position, engaged to the shaft of the carrier 58 to impede the rotation of the carrier 58. The input shaft 46 rotates the ring gear 50, which drives rotation of the planet gears 54, 56 about their respective axis. The axes of the planet gears 54, 56 remain stationary since the carrier 58 is not rotating. The rotating planet gears 54, 56 drive rotation of the sun gear 52 and accordingly of the output shaft 48. In this configuration, the gearbox 40 defines a speed ratio different than 1 between the rotational speeds of the input and output shafts 46, 48; as mentioned above, in the particular embodiment shown the gearbox 40 provides for a speed increase between the input and output shaft 46, 48. In other words, the ratio of the rotational speed of the input shaft 46 on the rotational speed of the output shaft 48 $\omega_{IN}/\omega_{OUT}$ is smaller than 1.

As shown in FIG. 2b, in the direct drive configuration, the brake 62 is in its release position, disengaged from the carrier 58 and thus allowing the carrier 58 to rotate. As the torque is applied to the ring gear 50 by the input shaft 46, the carrier 58 and sun gear 52 both start to rotate about their central axis. Since the sun gear 52 is connected to the load and the carrier 58 is not, the carrier 58, if free, would accelerate faster than the sun gear 52. The clutch 60, which in a particular embodiment is a one-way clutch, is in its engaged position and connects the output shaft 48 to the carrier 58 so that they are rotatable together at the same rotational speed. Since the sun gear 52 and carrier 58 are both connected to the output shaft 48 and rotate together at the same rotational speed due to the engaged clutch 60, the planet gears 54, 56 do not rotate about their respective axis.

The ring gear 50, carrier 58 and sun gear 52 thus all rotate at the same rotational speed, defining a direct drive between the input and output shafts 46, 48—the input and output shafts 46, 48 rotate together as a single shaft. In other words, the ratio of the rotational speed of the input shaft 46 on the rotational speed of the output shaft 48 $\omega_{IN}/\omega_{OUT}$ is 1.

Referring now to FIGS. 4a, 4b and 5, another particular embodiment of the gearbox 140 is generally shown, where elements similar to that of the gearbox 40 of FIGS. 2a, 2b and 3 are designated with the same reference numerals. Similarly to the gearbox 40, the input shaft 46 is connected to the ring gear 50. However, in this embodiment, the output shaft 48 is connected to the carrier 58. The sun gear 52 is thus the intermediate component which is selectively engageable by the brake 162, either directly or (as shown here) by having the brake 162 engaging a shaft connected to the sun gear 52. The blocking member 60 is a clutch which in the engaged position connects the shaft of the sun gear 58 (i.e., the intermediate component) to the output shaft 48 so that the sun gear 58 and output shaft 48 are rotatable together at the same rotational speed. It is understood that the clutch 60 could alternately engage the sun gear 52 directly or any other component connected to the sun gear 52 and rotatable therewith, and/or any other component connected to the output shaft 48 and rotatable therewith (including, but not limited to, the carrier 58).

This gearbox 140 is also selectively configurable between a speed change configuration where the output shaft 48 rotates faster than the input shaft 46, and a direct drive configuration where the input and output shafts 46, 48 rotate together as a single shaft. As can be best seen in FIG. 5, in order for the input and output shafts 46, 48 (ring gear 50 and carrier 58) to have the same direction of rotation, the planet gears 154 are each in meshed engagement with both the sun gear 52 and the ring gear 50. Although three planet gears 154 are shown, it is understood that alternately more or less planet gears may be provided.

As shown in FIG. 4a, in the speed change configuration, the clutch 60 is in its disengaged position, to allow the output shaft 48 and the sun gear 52 to rotate with respect to each other. The brake 162 is in its brake position, engaged to the shaft of the sun gear 52 to impede its rotation. The input shaft 46 rotates the ring gear 50, which drives rotation of the planet gears 154 about their respective axis. The rotating planet gears 154 drive rotation of the carrier 58 and accordingly of the output shaft 48. In this configuration, the gearbox 140 defines a speed ratio different than 1 between the rotational speeds of the input and output shafts 46, 48; as mentioned above, in the particular embodiment shown the gearbox 40 provides for a speed increase between the input and output shaft 46, 48, i.e., the ratio of the rotational speed of the input shaft 46 on the rotational speed of the output shaft 48 $\omega_{IN}/\omega_{OUT}$ is smaller than 1.

As shown in FIG. 4b, in the direct drive configuration, the brake 162 is in its release position, disengaged from the shaft of the sun gear 52 and thus allowing for the sun gear 52 to rotate. As the torque is applied to the ring gear 50 by the input shaft 46, the carrier 58 and sun gear 52 both start to rotate about their central axis. Since the carrier 58 is connected to the load and the sun gear 52 is not, the sun gear 52, if free, would accelerate faster than the carrier 58. The clutch 60 is in its engaged position and connects the output shaft 48 to the shaft of the sun gear 52 so that they are rotatable together at the same rotational speed. Since the sun gear 52 and carrier 58 are both connected to the output shaft 48 and rotate together at the same rotational speed due to the engaged clutch 60, the planet gears 154 do not rotate about their respective axis. The ring gear 50, carrier 58 and sun gear 52 thus all rotate at the same rotational speed, defining a direct drive between the input and output shafts 46, 48. The input and output shafts 46, 48 rotate together as a single shaft, i.e. the ratio of the rotational speed of the input shaft 46 on the rotational speed of the output shaft 48 $\omega_{IN}/\omega_{OUT}$ is 1.

Figure 6B:
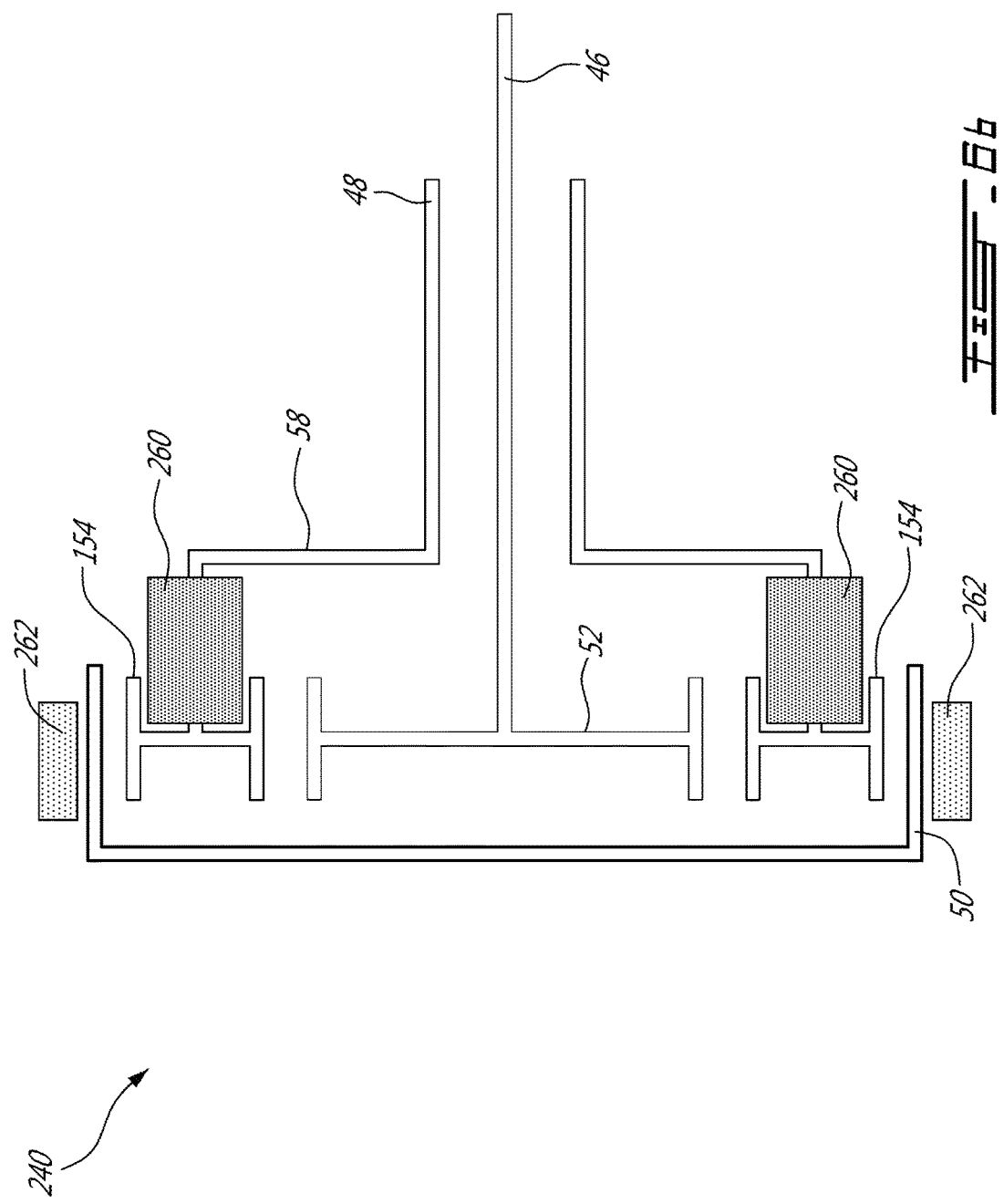
FIG. 6b is a schematic side view of the gearbox of FIG. 6a in a direct drive configuration.

Referring now to FIGS. 6a and 6b, another particular embodiment of the gearbox 240 is generally shown, where elements similar to that of the gearboxes 40, 140 are designated with the same reference numerals. Similarly to the gearbox 140, the output shaft 48 is connected to the carrier 58. However, in this embodiment, the input shaft 46 is connected to the sun gear 52. The ring gear 50 is thus the intermediate component which is selectively engageable by the brake 262. The blocking member 260 includes a second brake engaging the planet gears 154 to directly impede their rotation about their respective axis.

This gearbox 240 is selectively configurable between a speed change configuration where the output shaft 48 rotates more slowly than the input shaft 46, and a direct drive configuration where the input and output shafts 46, 48 rotate together as a single shaft. Similarly to the gearbox 140 and as illustrated in FIG. 5, in order for the input and output shafts 46, 48 (sun gear 52 and carrier 58) to have the same direction of rotation, the planet gears 154 are each in meshed engagement with both the sun gear 52 and the ring gear 50.

As shown in FIG. 6a, in the speed change configuration, the planet brake 260 is in its disengaged position, to allow the planet gears 154 to rotate about their respective axes. The ring gear brake 162 is in its brake position, engaged to the ring gear 50 to impede its rotation. The input shaft 46 rotates the sun gear 52, which drives rotation of the planet gears 154 about their respective axis. The rotating planet gears 154 drive rotation of the carrier 58 and accordingly of the output shaft 48. In this configuration, the gearbox 240 defines a speed ratio different than 1 between the rotational speeds of the input and output shafts 46, 48; as mentioned above, in the particular embodiment shown the gearbox 40 provides for a speed decrease between the input and output shaft 46, 48, i.e. the ratio of the rotational speed of the input shaft 46 on the rotational speed of the output shaft 48 $\omega_{IN}/\omega_{OUT}$ is greater than 1.

As shown in FIG. 6b, in the direct drive configuration, the ring gear brake 262 is in its release position, allowing for the ring gear 50 to rotate. As the torque is applied to the sun gear 52 by the input shaft 46, the carrier 58 and ring gear 50 both start to rotate about their central axis. Since the carrier 58 is connected to the load and the ring gear 50 is not, the sun gear 50, if free, would accelerate faster than the carrier 58. The planet brake 260 is in its engaged position blocks rotation of the planet gears 154 about their respective axes, thus forcing the carrier 58 and ring gear 50 to rotate together at the same rotational speed. The ring gear 50, carrier 58 and sun gear 52 thus all rotate at the same rotational speed, defining a direct drive between the input and output shafts 46, 48. The input and output shafts 46, 48 rotate together as a single shaft, i.e. the ratio of the rotational speed of the input shaft 46 on the rotational speed of the output shaft 48 $\omega_{IN}/\omega_{OUT}$ is 1.

It is understood that the embodiments shown are exemplary only and that variations are possible. In a particular embodiment, various configurations may be obtained by having one of the ring gear 50, sun gear 52 and carrier 58 as the input component connected to the input shaft 46, another one of the ring gear 50, sun gear 52 and carrier 58 as the output component connected to the output shaft 48, and the remaining one of the ring gear 50, sun gear 52 and carrier 58 as the intermediate component which is engaged by the brake 62, 162, 262 in the speed change configuration. The blocking member (e.g., clutch 60, brake 260) impedes rotation of the planet gears about their respective axis in the direct drive configuration, either by directly engaging the planet gears to impede their rotation, or by connecting the intermediate component with the output shaft 48 so that they rotate together at the same speed. Examples of such configurations are illustrated in the table below (where configuration 1 is the configuration of FIGS. 2a-2b, configuration 2 is the configuration of FIGS. 4a-4b, and configuration 3 is the configuration of FIGS. 6a-6b):

| | Input component | Output component | Intermediate component | Blocking member |
|---|---|---|---|---|
| 1 | Ring gear | Sun gear | Carrier | Clutch to connect intermediate and output components |
| 2 | Ring gear | Carrier | Sun gear | Clutch to connect intermediate and output components |
| 3 | Sun gear | Carrier | Ring gear | Brake engageable to planet gears |
| 4 | Sun gear | Ring gear | Carrier | Brake engageable to planet gears |
| 5 | Carrier | Sun gear | Ring gear | Brake engageable to planet gears |
| 6 | Carrier | Ring gear | Sun gear | Brake engageable to planet gears |

Other variations are also possible, including, but not limited to, having the blocking member configured as a brake engageable to the planet gears for configurations 1-2 and as a clutch to connect the intermediate and output components for configurations 3-6. A single set of planet gears as shown in FIG. 5 or dual sets of planet gears as shown in FIG. 3 may be used with any of the configurations to obtain the desired relative direction of rotation of the input and output shafts 46, 48.

In the embodiment shown, the input and output shafts 46, 48 are coaxial, and the gearbox 40 is configured to be used coaxially with the centerline of the gas turbine engine 10. Other configurations are also possible.

Figure 7A:
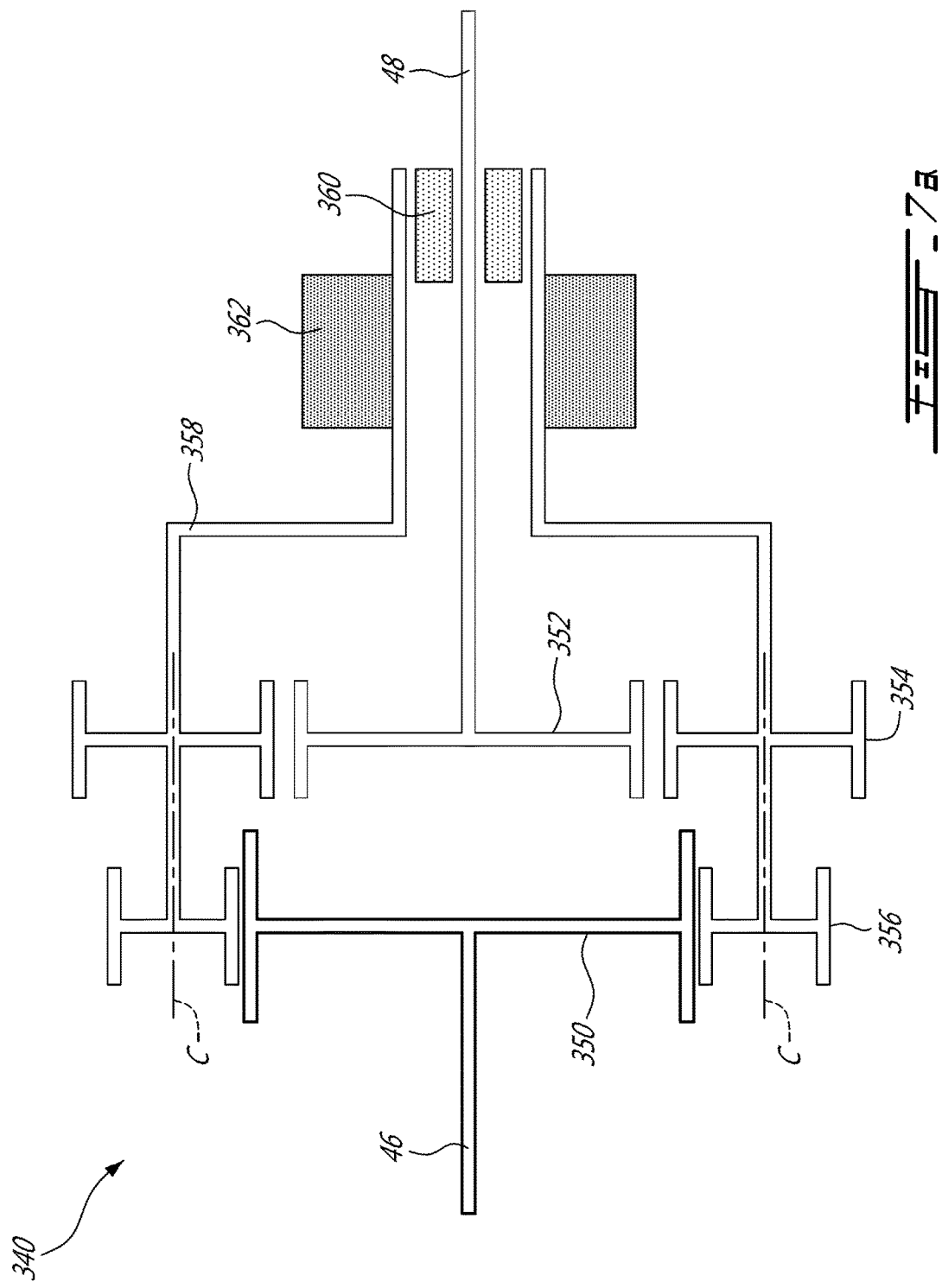
FIG. 7a is a schematic side view of a gearbox in accordance with a further particular embodiment which can be used in a gas turbine engine such as shown in FIG. 1, the gearbox being shown in a speed change configuration.

Referring now to FIGS. 7a, 7b and 8, another particular embodiment of the gearbox 340 is generally shown, which drivingly engages input and output shafts 46, 48. In this embodiment, the gearbox 340 includes first and second sun gears 350, 352 in driving engagement with each other through planet gears 354, 356 supported by a rotatable carrier 358. In the particular embodiment shown, the first sun gear 350 is the input component and is connected to the input shaft 46, the second sun gear 352 is the output component and is connected to the output shaft 48, and the carrier 358 is an intermediate component. Other configurations are possible, as will be further detailed below.

As can be best seen in FIG. 8, in order for the input and output shafts 46, 48 (sun gear 350, 352) to have the same direction of rotation, the planet gears include pairs of interconnected planet gears 354, 356 rotatable together about a common axis. The pairs of interconnected planet gears 354, 356 each include a smaller planet gear 356 meshed with the input sun gear 350 and a larger planet gear 354 meshed with the output sun gear 352, and the input sun gear 150 is larger than the output sun gear 152. This configuration allows for the speed change configuration to define a speed increase between the input and output shaft 46, 48; it is understood that the proportions of the gears 350, 352, 354, 356 can be changed to have an embodiment where the speed change configuration allows for the output shaft 48 to rotate slower than the input shaft 46. Although three pairs of planet gears 534, 356 are shown, it is understood that alternately more or less pairs of planet gears may be provided.

Referring back to FIGS. 7a-7b, the gearbox 340 further includes a blocking member 360 which in an engaged position (FIG. 7b) impedes the rotation of the planet gears 354, 356 about their respective central axis C. In the embodiment shown, the blocking member 360 is a clutch which in the engaged position connects the carrier 358 (i.e., the intermediate component) to the output shaft 48 so that they are rotatable together at the same rotational speed. In the embodiment shown, the clutch 360 connects the carrier 358 and the output shaft 48 by engaging a shaft of the carrier 358 and the output shaft 48. Alternately, the clutch 360 can engage any other element connected to the carrier 358 and rotatable therewith at the same rotational speed and/or any other element connected to the output shaft 48 and rotatable therewith at the same rotational speed (including, but not limited to, the output sun gear 352). By forcing the carrier 358 and output shaft 48 to rotate at the same rotational speed, the clutch 360 prevents the planet gears 354, 356 from rotating about their axes C. The clutch 360 also has a disengaged position (FIG. 7a) where it is disengaged from one or both of the carrier 358 and the output shaft 48, so they can rotate relative to each other.

The gearbox also includes a brake 362 which in a brake position (FIG. 7a) is engaged the shaft of the carrier 358 (i.e., the intermediate component) to impede its rotation. The brake 362 also has a release position (FIG. 7b) where it is disengaged from the carrier 358 to allow its rotation.

As shown in FIG. 7a, in the speed change configuration, the clutch 360 is in its disengaged position, to allow the output shaft 48 and the carrier 358 to rotate with respect to each other. The brake 362 is in its brake position, engaged to the shaft of the carrier 358 to impede the rotation of the carrier 358. The input shaft 46 rotates the input sun gear 350, which drives rotation of the planet gears 354, 356 about their respective axis. The axes of the planet gears 354, 356 remain stationary since the carrier 358 is not rotating. The rotating planet gears 354, 356 drive rotation of the output sun gear 352 and accordingly of the output shaft 48. In this configuration, the ratio of the rotational speed of the input shaft 46 on the rotational speed of the output shaft 48 $\omega_{IN}/\omega_{OUT}$ is different from 1.

As shown in FIG. 7b, in the direct drive configuration, the brake 362 is in its release position, disengaged from the carrier 358 and thus allowing for the carrier 358 to rotate. As the torque is applied to the input sun gear 350 by the input shaft 46, the carrier 358 and output sun gear 352 both start to rotate about their central axis. Since the output sun gear 352 is connected to the load and the carrier 358 is not, the carrier 358, if free, would accelerate faster than the output sun gear 352. The clutch 360 is in its engaged position and connects the output shaft 48 to the carrier 358 so that they are rotatable together at the same rotational speed. Since the output sun gear 352 and carrier 358 are both connected to the output shaft 48 and rotate together at the same rotational speed due to the engaged clutch 360, the planet gears 354, 356 do not rotate about their respective axis. The ring gear 350, carrier 358 and sun gear 352 thus all rotate at the same rotational speed, defining a direct drive between the input and output shafts 46, 48—the input and output shafts 46, 48 rotate together as a single shaft, with the ratio of the rotational speed of the input shaft 46 on the rotational speed of the output shaft 48 $\omega_{IN}/\omega_{OUT}$ being 1.

In a particular embodiment, various configurations may be obtained by having one of the sun gears 350, 352 and carrier 358 as the input component connected to the input shaft 46, another one of the sun gears 350, 352 and carrier 358 as the output component connected to the output shaft 48, and the remaining one of the sun gears 350, 352 and carrier 358 as the intermediate component which is engaged by the brake 362 in the speed change configuration. The blocking member (e.g., clutch 360) impedes rotation of the planet gears about their respective axis in the direct drive configuration, either by directly engaging the planet gears to impede their rotation, or by connecting the intermediate component with the output shaft 48 so that they rotate together at the same speed. Similar configurations can be obtained with the two sun gears 350, 352 being replaced by two ring gears. Examples of two sun gear configurations and of two ring gear configurations are illustrated in the table below (where configuration 7 is the configuration of FIGS. 7a-7b):

| | Input component | Output component | Intermediate component | Blocking member |
|---|---|---|---|---|
| 7 | Sun gear 1 | Sun gear 2 | Carrier | Clutch to connect intermediate and output components |
| 8 | Ring gear 1 | Ring gear 2 | Carrier | Clutch to connect intermediate and output components |
| 9 | Sun gear 1 | Carrier | Sun gear 2 | Clutch to connect intermediate and output components |
| 10 | Ring gear 1 | Carrier | Ring gear 2 | Clutch to connect intermediate and output components |

Other configurations are also possible, including, but not limited to, having the blocking member configured as a brake engageable to the planet gears for the configurations set forth above. For configurations where the relative direction of rotation of the input and output shafts 46, 48 needs to change, each planet gear may be replaced by two meshed planet gears each meshed with a respective one of the sun/ring gears, similarly to the embodiment shown in FIG. 3.

In a particular embodiment, failure, malfunction or wear of the brakes 62, 162, 262, 362 can be detected by the control system of the engine 10 (electronic engine controller or EEC) through detection of the resulting increased rotational speed of the output shaft 48. Malfunction or wear of the blocking member (e.g. clutch 60, 360, brake 260) can be detected by the EEC through detection of the resulting inconsistencies between the rotational speed of the input shaft 46 and the rotational speeds of the output shaft 48.

In a particular embodiment and in use, a rotor (e.g. boost compressor rotor 30, propeller 112) of the gas turbine engine 10 is thus rotated in accordance with the following. The input shaft 46 is rotated with a turbine section 18 of the gas turbine engine 10, for example through a direct connection between one or more rotor(s) of the turbine section 18 and a gas turbine shaft (e.g. low pressure turbine rotor(s) 26 and shaft 20) and a direct connection between the gas turbine shaft and the input shaft. One component between the sun/ring gears 50, 52, 350, 352 and the carrier 58, 358 is rotated with the input shaft 46 while another one of the sun/ring gears 50, 52, 350, 352 and the carrier 58, 358 is connected to the output shaft 48 and the remaining one of the sun/ring gears 50, 52, 350, 352 and the carrier 58, 358 defines the intermediate component.

When the direct drive configuration is selected, the rotation of the planet gears 54, 56, 154, 354, 356 is impeded while allowing rotation of the intermediate component so that the input and output shafts 48 rotate together as a single shaft at a same rotational speed. When the second configuration is selected, the rotation of the intermediate component is impeded while allowing rotation of the planet gears 54, 56, 154, 354, 356 so that the input and output shafts 46, 48 rotate with different rotational speeds. The output shaft 48 is then driven by the input shaft 46 through the gearbox 40, 140, 240, 340 in the selected configuration, and the rotor is rotated with the output shaft 48.

Although the gearbox 40, 140, 240, 340 has been described as part of a gas turbine engine 10, it is understood that the gearbox 40, 140, 240, 340 may alternately be used in other suitable applications where an alternate direct drive/speed change drive is beneficial.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A gearbox for a gas turbine engine, the gearbox comprising:
   a gear assembly including first and second gears in driving engagement through planet gears, the planet gears rotatable about a respective central axis and supported by a carrier, the assembly connected to input and output shafts and including at least one rotatable intermediate component;
   a brake configured to selectively impede rotation of the intermediate component; and
   a blocking member configured to selectively impede rotation of the planet gears about the central axes;
   wherein the gearbox is selectively configurable between:
     a speed change configuration wherein the brake is configured to impede the rotation of the intermediate component and the blocking member is configured to allow the rotation of the planet gears about the central axes to define a speed ratio different than 1 between rotational speeds of the input and output shafts; and
     a direct drive configuration wherein the brake is configured to allow the rotation of the intermediate component and the blocking member is configured to impede the rotation of the planet gears about the central axes so that the input and output shafts are rotatable together at a same rotational speed.

2. The gearbox as defined in claim 1, wherein the blocking member is a clutch selectively interconnecting the output shaft to the intermediate component so that the output shaft and the intermediate component are rotatable together at the same rotational speed, the output shaft and the intermediate component rotatable together at the same rotational speed preventing the rotation of the planet gears about the central axes.

3. The gearbox as defined in claim 2, wherein the first gear is connected to the input shaft and is configured as a ring gear, the second gear is connected to the output shaft and is configured as a sun gear, the intermediate component is the carrier, and the planet gears include a first set of planet gears in meshed engagement with the first gear and a second set of planet gears in meshed engagement with the second gear, corresponding planet gears of the first and second sets being meshed together.

4. The gearbox as defined in claim 2, wherein the first gear is connected to the input shaft and is configured as a ring gear, the carrier is connected to the output shaft, and the intermediate component is the second gear and is configured as a sun gear.

5. The gearbox as defined in claim 2, wherein the first gear is connected to the input shaft and is configured as a first sun gear, the second gear is connected to the output shaft and is configured as a second sun gear, and the intermediate component is the carrier, the planet gears including pairs of first and second interconnected planet gears rotatable together, the first planet gears in meshed engagement with the first sun gear and the second planet gears in meshed engagement with the second sun gear.

6. The gearbox as defined in claim 1, wherein the blocking member is a brake selectively engageable to the planet gears.

7. The gearbox as defined in claim 1, wherein the input and output shafts are coaxial.

8. A gas turbine engine comprising:
   an input shaft drivingly engaged to a turbine rotor;
   an output shaft drivingly engaged to a drivable rotor; and
   a gearbox including first and second gears in driving engagement through planet gears, the planet gears rotatable about a respective central axis and supported by a carrier, wherein: one of the first gear, second gear and carrier is connected to the input shaft, another one of the first gear, second gear and carrier is connected to the output shaft, and a remaining one of the first gear, second gear and carrier is an intermediate component, the gearbox further including a brake and a blocking member, the brake selectively movable between a brake position impeding rotation of the intermediate component and a release position allowing rotation of the intermediate component, the blocking member selectively movable between an engaged position impeding rotation of the planet gears about the central axes and a disengaged position allowing rotation of the planet gears about the central axes;
   wherein the gearbox is selectively configurable between:
     a direct drive configuration where the brake is in the release position and the blocking member is in the engaged position, and
     a speed change configuration where the brake is in the brake position and the blocking member is in the disengaged position.

9. The gas turbine engine as defined in claim 8, wherein the drivable rotor is a compressor rotor.

10. The gas turbine engine as defined in claim 9, wherein the turbine rotor is a low pressure turbine rotor and the compressor rotor is a boost compressor rotor, and the gas turbine engine further comprises a high pressure turbine rotor rotatable independently of the input shaft and located upstream of the low pressure turbine rotor.

11. The gas turbine engine as defined in claim 8, wherein the drivable rotor is a propeller.

12. The gas turbine engine as defined in claim 8, wherein the blocking member is a clutch selectively interconnecting the output shaft to the intermediate component so that the output shaft and the intermediate component are rotatable together at the same rotational speed, the output shaft and the intermediate component rotatable together at the same rotational speed preventing the rotation of the planet gears about the central axes.

13. The gas turbine engine as defined in claim 12, wherein the first gear is connected to the input shaft and is configured as a ring gear, the second gear is connected to the output shaft and is configured as a sun gear, the intermediate component is the carrier, and the planet gears include a first set of planet gears in meshed engagement with the first gear and a second set of planet gears in meshed engagement with the second gear, corresponding planet gears of the first and second sets being meshed together.

14. The gas turbine engine as defined in claim 12, wherein the first gear is connected to the input shaft and is configured as a ring gear, the carrier is connected to the output shaft, and the intermediate component is the second gear and is configured as a sun gear.

15. The gas turbine engine as defined in claim 12, wherein the first gear is connected to the input shaft and is configured as a first sun gear, the second gear is connected to the output shaft and is configured as a second sun gear, and the intermediate component is the carrier, the planet gears including pairs of first and second interconnected planet gears rotatable together, the first planet gears in meshed engagement with the first sun gear and the second planet gears in meshed engagement with the second sun gear.

16. The gas turbine engine as defined in claim 8, wherein the blocking member is a brake selectively engageable to the planet gears.

17. The gas turbine engine as defined in claim 8, wherein the input and output shafts are coaxial.

18. A method of rotating a rotor of a gas turbine engine through a gearbox including first and second gears drivingly interconnected by rotatable planet gears supported by a carrier, the method comprising:
  rotating an input shaft with a turbine section of the gas turbine engine;
  rotating one of the first gear, the second gear and the carrier with the input shaft while another one of the first gear, the second gear and the carrier is connected to an output shaft and a remaining one of the first gear, the second gear and the carrier is an intermediate component;
  configuring the gearbox in a selected one of a direct drive configuration and a speed change configuration, including:
    when the direct drive configuration is selected, preventing rotation of the planet gears while allowing rotation of the intermediate component so that the input and output shafts rotate together as a single shaft at a same rotational speed, and
    when the second configuration is selected, preventing rotation of the intermediate component while allowing rotation of the planet gears so that the input and output shafts rotate at different rotational speeds; and
  driving the output shaft with the input shaft through the gearbox, and rotating the rotor with the output shaft.

19. The method as defined in claim 18, wherein the rotor is part of a low pressure compressor section of the gas turbine engine.

20. The method as defined in claim 18, wherein the rotor is a propeller.

* * * * *